Figure 1:
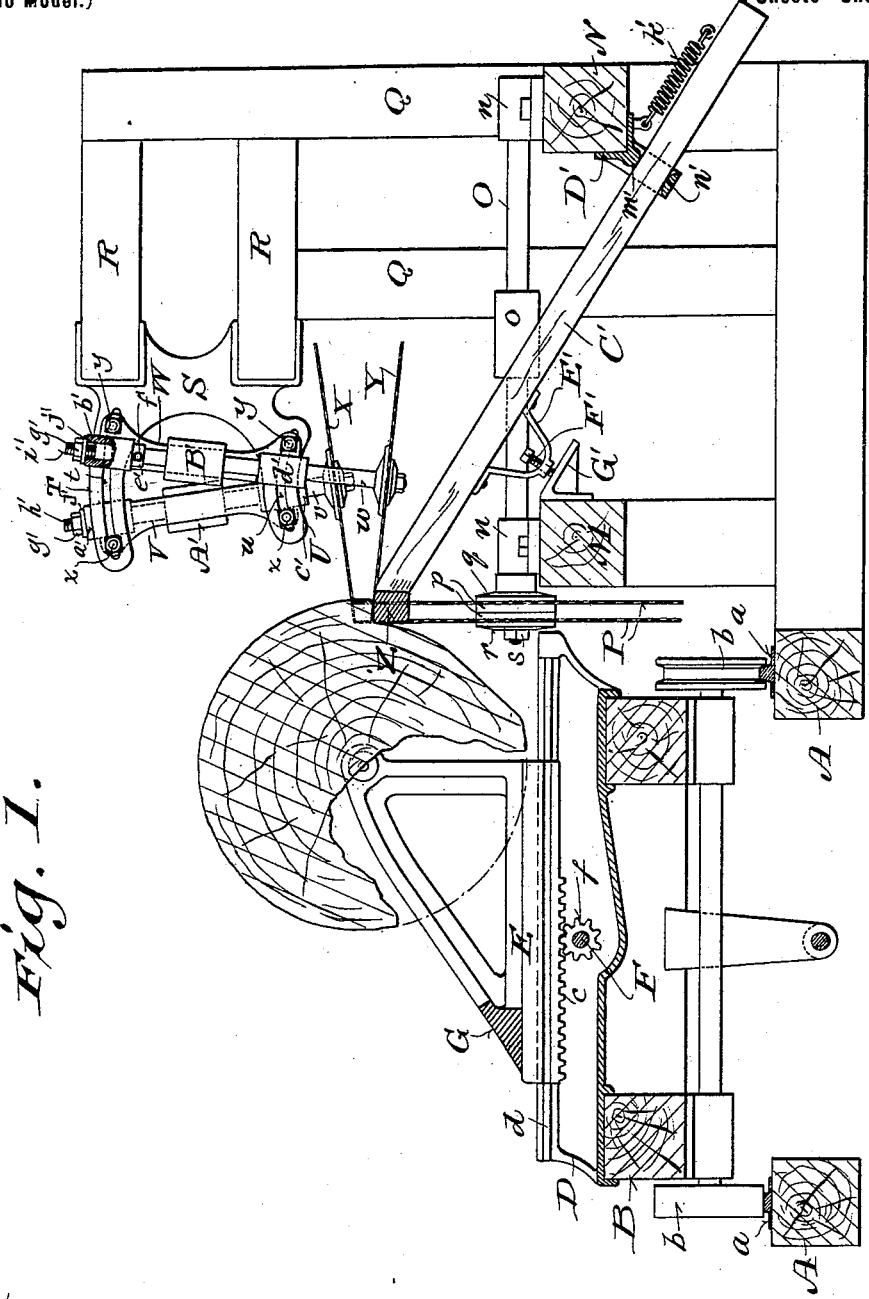

No. 626,846. Patented June 13, 1899.
D. S. STEWART.
SAWING MACHINE.
(Application filed Sept. 1, 1898.)
(No Model.) 3 Sheets—Sheet 1.

Witnesses:
Geo. W. Young,
B. C. Roloff.

Inventor:
David S. Stewart
By H. G. Underwood
Attorney

No. 626,846. Patented June 13, 1899.
D. S. STEWART.
SAWING MACHINE.
(Application filed Sept. 1, 1898.)
(No Model.) 3 Sheets—Sheet 2.
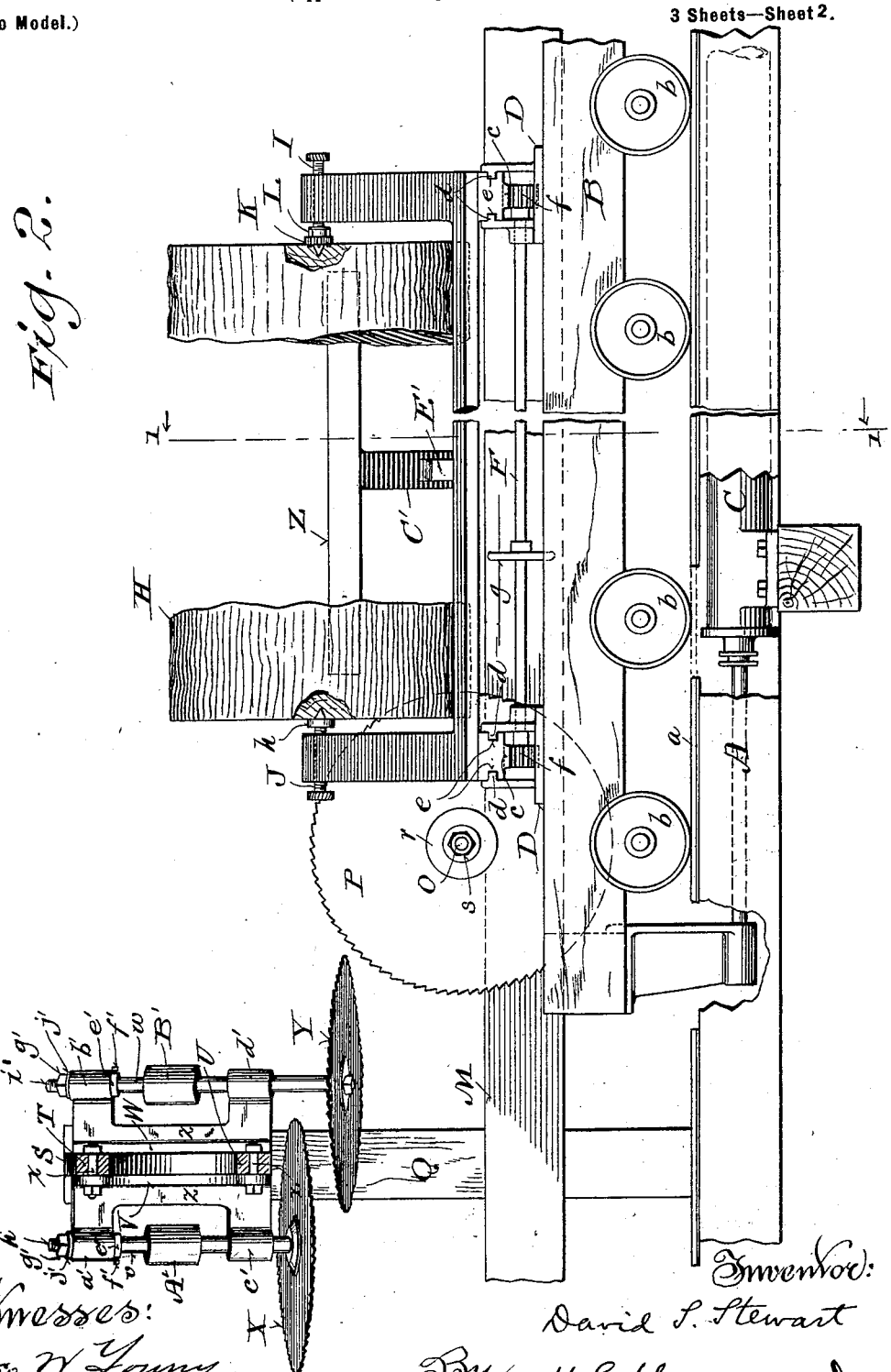
Witnesses:
Geo. W. Young,
B. C. Roloff.
Inventor:
David S. Stewart
By H. G. Underwood
Attorney

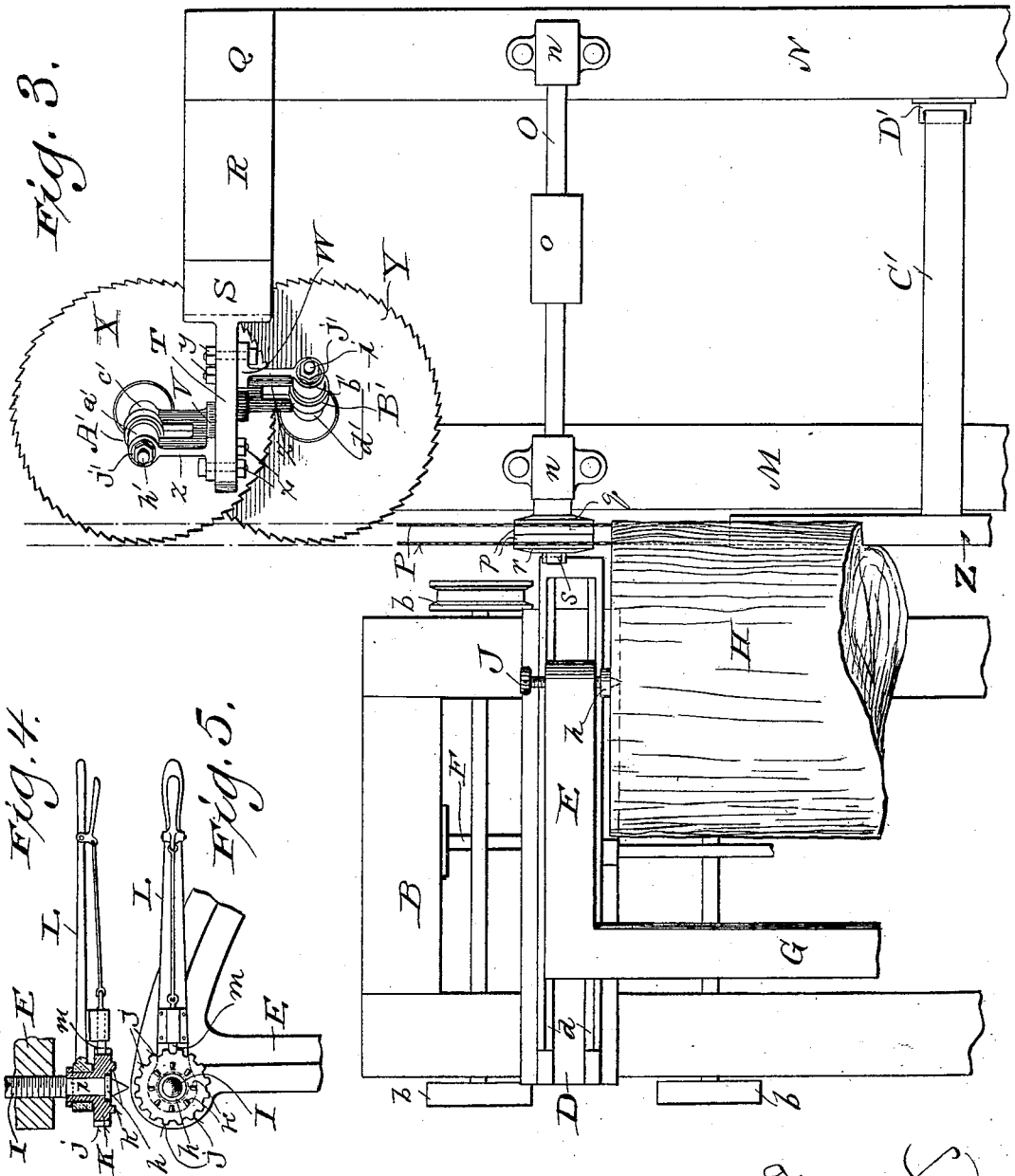

UNITED STATES PATENT OFFICE.

DAVID S. STEWART, OF CLINTONVILLE, WISCONSIN, ASSIGNOR OF ONE-HALF TO THE G. W. JONES LUMBER COMPANY, OF SAME PLACE.

SAWING-MACHINE.

SPECIFICATION forming part of Letters Patent No. 626,846, dated June 13, 1899.

Application filed September 1, 1898. Serial No. 690,003. (No model.)

*To all whom it may concern:*

Be it known that I, DAVID S. STEWART, a citizen of the United States, and a resident of Clintonville, in the county of Waupaca and State of Wisconsin, have invented certain new and useful Improvements in Sawing-Machines; and I do hereby declare that the following is a full, clear, and exact description thereof.

My invention relates to machines for sawing either square or bevel-edged lumber from logs; and it consists in certain peculiarities of construction and combination of parts, as will be fully set forth hereinafter and subsequently claimed.

In the drawings, Figure 1 is a transverse section through a machine embodying my present invention on the line indicated by 1 1 in Fig. 2. Fig. 2 is a side elevation thereof, parts being broken away to better illustrate certain details of construction. Fig. 3 is a plan view of parts of the machine. Figs. 4 and 5 are detail views of the log-turning mechanism.

Referring to the drawings, A A represent the bed-pieces of a reciprocating timber-carriage, and *a a* the tracks thereon.

B represents the truck-frame of said timber-carriage, and *b b* are the wheels thereof moving on said tracks *a a*. This carriage is caused to reciprocate to a proper distance by any suitable feedworks—such, for example, as the steam or compressed-air cylinder C and attachments shown in Fig. 2—and carries the log to be cut.

D D are transverse slideways on the truck-frame B to receive the end pieces E E of the carriage and permit the same to be moved toward or from the saw-frame. The said slideways are preferably formed each with two vertical flanges having longitudinal ribs *d d* on their inner faces to engage with corresponding grooves *e e* in the base portions of the said end pieces E E, said base portions being formed with toothed racks *c c* on their under sides, which engage with pinions *f f* on the ends of a rod F, turned by a hand-wheel *g* thereon, when it is desired to move the said carriage in or out, all substantially as set forth in my prior patent, No. 606,035, dated June 21, 1898, except that in the present case I prefer to make the said end pieces E E of less height than formerly and connect them together by a front lower rail or rod G and to strengthen the end pieces by oblique braces extending between the horizontal and vertical arms thereof.

H represents the log, which is placed between the end pieces E E of the carriage and secured by the centers I J. The center J is a pointed screw whose threaded shank passes through a threaded bore in the upper end of one end piece E, and the pointed end of which screw enters the log as far as the collar *h* on the shank will permit. The other center I is shown in detail in Fig. 4. It is likewise a pointed screw, whose threaded shank passes through a threaded bore in the other end piece E and whose pointed end enters the end of the log H, as in the case of the other center, so that the said log may be revolved on said centers; but between the collar *h* on the center I and the adjacent threaded part of the shank the said shank is diametrically reduced, as shown at *i*, and fitted with a sleeve K, whose inner end is increased in diameter and formed with a toothed periphery or circumferential rack *j*, while its inner face is provided with an annular series of points *k k*, which are driven into the end of the log by turning the said center I. The sleeve K is further provided with an exterior circumferential groove, which receives the head of a lever L, provided with a movable dog *m* for engagement with the teeth of the described circumferential rack *j*, whereby the log is turned as desired by said lever.

I will next describe the arrangement of the saws. M N are horizontally-disposed timbers forming a part of the frame of the machine and supported at such a plane that their upper surfaces are practically in line with the upper surfaces of the transverse slideways D, and these timbers M N are provided with journal-boxes *n n* for the reception of a horizontally-disposed arbor O, having a centrally-arranged pulley *o* thereon for the reception of a suitable power-belt. (Not shown.) At the inner end of said arbor are carried two vertically-arranged saws P P, which can be secured at any desired distance apart by means of suitable washers *p p*, interposed between them, the saws and adjusting-washers being firmly clamped between a disk $q$, which has a collar whereby it is secured to the arbor, and another disk $r$ and nut $s$ on the extreme inner projecting end of the said arbor O.

Q Q represent vertical timbers at one end of the machine-frame, with horizontal pieces R R connected thereto to receive and support the upper saw-supporting frame S, which has an upper segmental arm T, with a segmental slot $t$ therein, and a lower segmental arm U, provided with a like slot $u$.

V W represent the inner plates of the adjustable bearings for the arbors $v$ $w$ of the upper saws X Y, the arbor $w$ being the longer of the two. Each of the said plates V W is a flat plate adapted to rest against the segmental arms T U on opposite sides thereof and having upper and lower bolt-holes to receive the shanks of headed screw-bolts, which pass through the segmental slots $t$ $u$ and which after adjustment are tightened by nuts, the bolts appertaining to the plate V being marked $x$ $x$ and those belonging to plate W being lettered $y$ $y$. Each plate V W has a transverse web $z$ centrally cut away to afford room for the pulleys A' B' on the arbors $v$ $w$ and for the belts (not shown) which are intended to run on said pulleys, and the said webs terminate in longitudinally-bored bearings $a'$ $c'$ and $b'$ $d'$, respectively, for the said arbors $v$ and $w$. Each arbor is provided with a movable collar $e'$, secured in desired position just below the upper bearing $a'$ or $b'$ by a set-screw $f'$, and each arbor terminates in a reduced screw-threaded upper end, (marked $h'$ and $i'$, respectively,) and after the arbor has been adjusted to project the length required (by the just-described adjustment of the collar $e'$) then a washer $j'$ is slipped over the end $h'$ or $i'$ of the arbor, resting on top of the bearing $a'$ or $b'$, and a nut $g'$ is screwed on said end down upon said washer. In this manner the saws X and Y can be adjusted and held at any desired distance apart, and by means of the previously-described segmental slotted arms T U and attachments the arbors can be adjusted so as to regulate the angle of inclination of the said saws toward each other, and thus determine the bevel of the opposed edges of the lumber to be cut from the log.

Z represents a horizontal bar forming a gage, and C' an obliquely-disposed arm projecting downward from the center of the bar Z and extending through a casing or guide D', secured to the timber N, said casing or guide having rounded contact-points, between which the arm C' moves, so as to reduce friction, and there being a spring $k'$ attached to said casing or guide and to the said arm C', whereby the latter is always impelled forward and the gage-bar Z kept in contact with the log, as best shown in Fig. 1. In order to adjust the gage to the desired height and maintain it in adjusted position, there is a loop E' attached to the under side of the arm C' and carrying an adjusting-screw F', having bearing upon the upper surface of an inclined plate G', which is secured to the timber M, all as illustrated in Fig. 1.

If it is desired to saw lumber having straight right-angled sides, as in my prior patent, hereinbefore referred to, the nuts $x$ $y$ are loosened and the plates V W of the bearings of the upper saws are brought parallel with each other, so that the said upper saws X Y shall be parallel and horizontal and the arbors of said saws adjusted in the manner already described to determine the thickness of the cut, and similarly if bevel-sided lumber is desired the said arbors are adjusted by necessary movement along the slotted segmental arms T U until the said upper saws assume the proper angle of inclination, the thickness of the cut of the lower vertically-disposed saws P P being determined by adjusting the space between them, as already described. It is necessary that the lower saw Y should project nearer the log to be sawed than the upper saw X in making the bevel-edged cut, as otherwise the piece being cut off would sag down and interfere with cutting the proper bevel on the under side of said piece, but with the said upper saws relatively arranged, as described, the lower saw Y of the pair of upper saws is enabled to properly trim the under surface of the piece to be cut off (the vertically-arranged saws P P having first made their cut) while it is still a part of the log and then the upper saw X of said upper pair severs the said piece, which is then complete and of the proper shape.

The operation of my machine will be readily understood from the foregoing description taken in connection with the accompanying drawings. When the saws have been adjusted in the manner described, according to the shape and size of the piece of lumber to be cut from the log H, the latter is then brought inward toward the line of the saws the proper distance by turning the rod F, and thereby, through the pinions $f$ $f$ on said rod and the racks $c$ $c$ on the under sides of the end pieces E E of the carriage, moving the latter inward. Power is then exerted by the feedworks, and the truck B of the carriage is moved forward the proper distance, and the log thus carried against the saws, which are meanwhile revolved by the requisite power applied to their arbors. The gage has been set to correspond in height to the level of the lower one of the upper saws, and when the carriage returns after its forward movement the freshly-cut portion of the log is received on the bar Z of the said gage, and no change in the adjustment of the gage is necessary so long as the said saw is unchanged in position. The log has to be turned after each cut, and when the carriage has been brought back this turning is readily accomplished by means of the lever L and its attachments already named, and when the log again rests on the gage it is in proper position for the next cut and ready for the next forward movement of the carriage.

Having thus described my invention, what I claim as new, and desire to secure by Letters Patent, is—

1. In a lumber-sawing machine, the combination with vertically-arranged revoluble saws of a saw-supporting frame located above the plane of said vertically-arranged saws, a pair of arbors, means for supporting and angularly adjusting said arbors on said saw-supporting frame, a substantially horizontally arranged saw on each arbor, one of said saws projecting below the other and being in advance thereof, and adapted to operate first on the work, substantially as described.

2. In a lumber-sawing machine, the combination with vertically-arranged revoluble saws, a log-carriage, means for reciprocating said carriage past the saws, and means for moving the carriage laterally, of an upper saw-supporting frame, a pair of arbors each carrying a substantially horizontally arranged saw, bearings for said arbors on said frame, means for securing said bearing in adjustable positions on said frame whereby the relative angularity of said arbors can be changed, and means for adjusting one of said saws axially whereby the distance between the saws can be changed, substantially as described.

3. In a lumber-sawing machine, the combination of a revoluble horizontal arbor carrying a pair of vertically-arranged saws, means for varying the distance between the saws of said pair; a saw-supporting frame located above the plane of said vertically-arranged saws and provided with slotted segmental arms; arbor-bearings adjustably secured to opposite sides of said arms; revoluble arbors of different lengths adjustably secured within said bearings; and saws upon the lower ends of said arbors revolving in different planes, the lower one of said saws being located nearer said vertically-arranged saws than the upper one.

4. In a lumber-sawing machine, the combination, with a suitable frame of a reciprocating and laterally adjustable log-carriage; series of saws adapted to revolve vertically, and other saws adapted to revolve horizontally or at any desired angle of inclination thereto, and an automatically-movable gage adapted to receive the log beneath each freshly-cut surface, and support it during the succeeding movement of the carriage.

5. In a lumber-sawing machine, the combination with vertically-arranged revoluble saws, of a saw-supporting frame, a pair of arbors, means for supporting said arbors one on each side of said frame, means for securing said arbors in angularly-adjusted positions relative to each other, a saw on each arbor working in a substantially horizontal plane, one of said saws projecting below the other and being in advance thereof and adapted to operate first on the work, substantially as described.

6. In a lumber-sawing machine, the combination with vertically-arranged revoluble saws, of a vertical saw-supporting frame located above the plane of said vertically-arranged saws, a pair of arbors, bearings for said arbors for supporting the same one on each side of said vertical frame, means for securing said bearings in angularly-adjusted positions relative to each other, a saw on each arbor working in a substantially horizontal plane, one of said saws projecting below the other and being in advance thereof and adapted to operate first on the work, substantially as described.

7. In a lumber-sawing machine, the combination with vertically-arranged revoluble saws, of a vertical saw-supporting frame located above the plane of said vertically-arranged saws, a pair of arbors, bearings for said arbors for supporting the same one on each side of said vertical frame, means for securing said bearings in angularly-adjusted positions relative to each other, a saw on each arbor working in a substantially horizontal plane, and means for supporting one of said arbors in axially-adjusted positions, substantially as described.

In testimony that I claim the foregoing I have hereunto set my hand, at Clintonville, in the county of Waupaca and State of Wisconsin, in the presence of two witnesses.

DAVID S. STEWART.

Witnesses:
L. E. KNUDSON,
A. H. RUTH.